United States Patent

Hausler et al.

[11] Patent Number: 5,118,549
[45] Date of Patent: * Jun. 2, 1992

[54] OPTICAL RECORDING MEDIUM

[75] Inventors: Alfons Hausler, Obertshausen; Rainer Ludwig, Karlstein-Dettingen; Michael Geisler, Wächtersbach; Michael Jung, Kahl am Main, all of Fed. Rep. of Germany

[73] Assignee: Leybold Aktiengesellschaft, Hanau I, Fed. Rep. of Germany

[*] Notice: The portion of the term of this patent subsequent to Sep. 11, 2007 has been disclaimed.

[21] Appl. No.: 554,664

[22] Filed: Jul. 17, 1990

Related U.S. Application Data

[63] Continuation-in-part of Ser. No. 261,766, Oct. 24, 1988, Pat. No. 4,956,216.

[30] Foreign Application Priority Data

Jun. 3, 1988 [DE] Fed. Rep. of Germany ....... 3818934

[51] Int. Cl.⁵ ................................................ B32B 3/02
[52] U.S. Cl. .................................... 428/64; 428/65; 428/457; 428/913; 369/275.2; 346/76 L; 346/135.1; 430/945; 427/162; 264/106
[58] Field of Search ............... 369/275.2; 346/76 L, 346/135.1; 428/64, 65, 457, 913; 430/945; 427/162; 264/106

[56] References Cited

U.S. PATENT DOCUMENTS

| | | | |
|---|---|---|---|
| 4,477,555 | 10/1984 | Oba et al. | 430/273 |
| 4,709,363 | 11/1987 | Dirks et al. | 369/275 |
| 4,754,128 | 6/1988 | Takeda et al. | 235/487 |
| 4,839,883 | 6/1989 | Nagata et al. | 369/288 |
| 4,956,216 | 9/1990 | Hausler et al. | 428/64 |

FOREIGN PATENT DOCUMENTS 86009 8/1983 European Pat. Off. .
25128 6/1988 European Pat. Off. .

OTHER PUBLICATIONS

Patent Abstracts of Japan, vol. 11, No. 13 (C-397) Jan. 14, 1987.

Primary Examiner—Patrick J. Ryan
Attorney, Agent, or Firm—Felfe & Lynch

[57] ABSTRACT

An optical recording medium for an audio-video or ROM compact disc comprises a pitted translucent base material and a layer of a corrosion resistant metal or combination of metals from the group consisting of tantalum, chromium, cobalt, and nickel. For example, TaNi or CrCo can be applied to the surface, providing good adhesion, reflecting light, providing a printable surface, and not requiring any further coating such as a protective lacquer.

16 Claims, 1 Drawing Sheet 5,118,549

OPTICAL RECORDING MEDIUM

RELATED APPLICATIONS

This application is a continuation-in-part of U.S. Pat. No. 4,956,216 which issued Sept. 11, 1990 the patent application having Ser. No. 261,766 filed Oct. 24, 1988 is now U.S. Pat. No. 4,956,216, by Hausler et al. and entitled "OPTICAL RECORDING MEDIUM".

FIELD OF THE INVENTION

The invention pertains to an optical recording medium, especially an audio, video or ROM compact disc medium, comprising a substrate of a translucent base material, for example a synthetic substrate with cavities formed in the substrate, the so-called "pits", and a light reflecting layer adhering firmly to one surface of the substrate and covering the pits.

DESCRIPTION OF THE PRIOR ART

An optical recording substrate, providing a substrate of translucent glass which is coated on one side by a first light reflecting layer, for example a layer of gold, onto which a second layer of a light-absorbing dye, for example a phthalocyanine dye, is applied, is known (U.S. Pat. No. 4,241,355). By means of a laser-beam the light-absorbing layer can be locally evaporated, so that recesses or pits are formed through which a light beam can fall onto the light reflecting layer. The substrate coated in this way is an effective medium, for providing pits having a suitable distribution, number and size. However, this known recording medium has the disadvantage that the applied layers are extremely sensitive to mechanical damage. Also this known manufacturing process is very complicated and, time-consuming and, therefore, expensive.

Another a compact disc, comprising a circular disc-shaped translucent synthetic substrate is known. Pits are impressed, cast, or preferably formed into the surface of this disc by pressing the synthetic substrate into a mold, in which the lateral wall provides a master plate. The pitted synthetic discs are then vapor-deposited with a layer of pure aluminum. Then aluminum itself has to be coated with a protective layer, so that the recording carrier is durable and corrosion resistant. The manufacture of this other known compact disc is also expensive, especially the varnishing of the metal layer, which is time consuming and has to be done extremely carefully.

Furthermore varnishing installations produce relatively large amounts of dust and chemical pollution which disturbs the high-vacuum deposition process, and they require a lot of space, which again affects manufacturing costs.

SUMMARY OF THE INVENTION

Therefore an object of the invention is to provide a moderate price recording medium which does not require a dye layer or a protective varnish.

This is accomplished in accordance with the present invention by applying a single layer to the substrate of a corrosion resistant metal or a combination of metals from the groups 4N, 5N, 6N, 7N or 8N of the periodic system of the elements, for example of NiCr, by means of cathode evaporation in vacuum.

If the light reflecting layer is supposed to be gold-colored, the layer applied onto the substrate by means of cathode evaporation in vacuum is formed of a corrosion resistant combination of metals from the groups 1N (copper, silver, and gold) and 2N (zinc, cadmium, and mercury) of the periodic table of the elements, for example of CuBe.

In any event, the layer applied by sputtering in vacuum has the advantage of being extremely resistant to mechanical damage; also it is very corrosion resistant and, thus, avoids application of the dye layer, which is so time consuming and requires a special facility for its application.

The invention allows very diverse possible embodiments; one of them is represented schematically in more detail in the attached drawings.

BRIEF DESCRIPTION OF THE DRAWINGS

DETAILED DESCRIPTION

Figure 1:
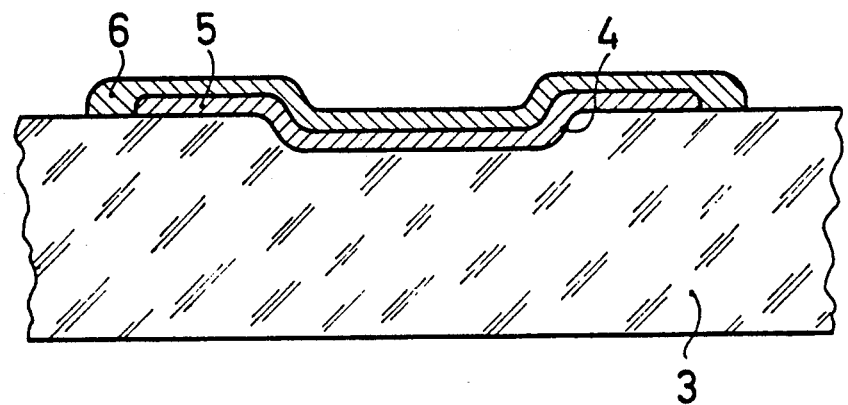

The conventional compact disc shown in FIG. 1 comprises a disc-shaped substrate (3) of a translucent synthetic, for example a polycarbonate, having cavities, the so-called "pits", (4) are impressed, spliced in or cast on one side. A layer (5) of pure aluminum is vapor deposited onto the surface of the substrate (3), at least in the area of the pits (4). After this the layer (5) is coated with a protective lacquer layer (6), which prevents damage or corrosion of the aluminum layer.

A light beam is directed from below onto the fast rotating disc-shaped substrate (3), it penetrates into the disc and then is reflected by the metal layer (5). The reflected light beam is captured by a sensor disposed below the disc and is processed to produce an electric signal. This is well-known method which does not require further discussion here.

Figure 2:
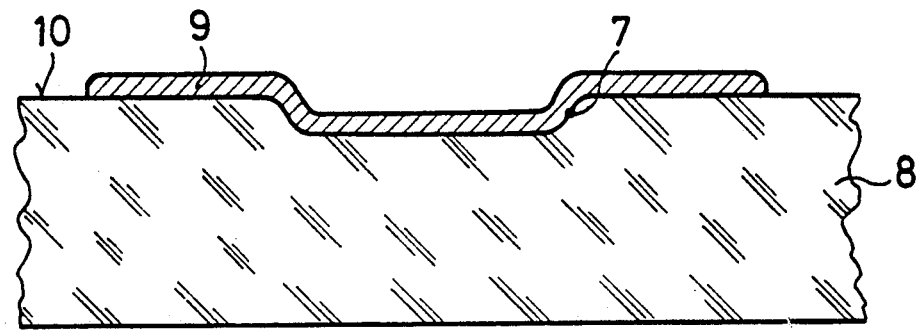

In the inventive embodiment according to FIG. 2 the substrate (8) having little cavities or pits (7) is coated with a layer (9) which is highly reflective, mar-proof, non-oxidizing and suitable for printing. This layer (9) is applied by DC-sputtering. Metals and combinations of metals from the groups 4N (titanium, zirconium, and hafnium), 5N (vanadium, niobium, and tantalum), 6N (chromium, molybdenum, and tungsten), 7N (manganese, technetium, and rhenium) or 8N (iron, cobalt, nickel, rethenium, rhodium, palladium, osmium, iridium, and platinum) of the periodic table of the elements can be used as materials for this purpose, as far as they provide the said properties, as for example nickel-chrome. Other desirable combinations of metals for forming the layer are tantalum-nickel, chromium-cobalt, and also aluminum nickel.

In the event that the disc is to be used as a CD-video disc and, thus, must be gold-colored, use of a copper-beryllium layer is recommended.

The particular advantage of the compact disc shown in the FIG. 2 is that it permits simplified, low-cost manufacturing, since a varnishing facility is no longer needed. In addition to this, the compact disc can be produced in any sputtering installation merely by using, for example, a nickel-chrome or copper-beryllium target.

What is claimed is:

1. An optical recording medium, comprising:
 a base material having a surface and
 a recording surface layer means applied to said surface, said recording surface layer means including:
 a light-reflecting layer adhering to said surface of the base material, said layer being formed of a metal or a combination of metals selected from the group consisting of tantalum, chromium, cobalt and nickel, and said layer being applied by means of cathode evaporation in a vacuum.

2. The invention according to claim 1, and the surface of the base material having recording recesses therein, and the light-reflecting layer being applied over said recesses.

3. The invention according to claim 2 and the light-reflecting layer providing a reflective recording surface having generally outwardly disposed recording recesses therein.

4. The invention according to claim 3 and said light-reflecting layer being formed of a combination of tantalum and nickel.

5. The invention according to claim 3 and said light-reflecting layer being formed of a combination of chromium and cobalt.

6. The invention according to claim 1 and said light-reflecting layer being formed of a combination of cobalt and chromium.

7. The invention according to claim 1 and said light-reflecting layer being formed of a combination of tantalum and nickel.

8. An optical recording medium, comprising:
a base material having a surface and
a recording surface layer means applied to said surface, said recording surface layer means including:
a light-reflecting layer adhering to said surface of the base material, said layer being formed of a combination of nickel with a metal selected from the group consisting of tantalum and aluminum and said layer being applied by means of cathode evaporation in a vacuum.

9. The invention according to claim 8 and said light-reflecting layer being formed of a combination of nickel and aluminum.

10. The invention according to claim 8 and the surface of the base material having recording recesses therein, and the light-reflecting layer being applied over said recesses.

11. The invention according to claim 10 and the light-reflecting layer providing a reflective recording surface having generally outwardly disposed recording recesses therein.

12. The invention according to claim 11 said layer being formed of a combination of nickel and aluminum.

13. A method of making an optical recording medium, said method comprising:
preparing a surface on a substrate, said surface having recesses therein corresponding to matter to be recorded on the optical recording medium; and
applying a light-reflecting layer onto said surface and over said recesses by cathode evaporation in a vacuum to form a light-reflecting outwardly-disposed surface means having outwardly-disposed recesses therein,
said light-reflecting layer being formed of a material selected from the group consisting of:
(a) a metal or a combination of metals selected from the group consisting of tantalum, chromium, cobalt, nickel, and
(b) a combination of aluminum and nickel.

14. The invention according to claim 13 and the layer being formed of a combination of cobalt and chromium.

15. The invention according to claim 13 and said layer being formed of a combination of tantalum and nickel.

16. The invention according to claim 13 and said layer being formed of a combination of aluminum and nickel.

* * * * *

UNITED STATES PATENT AND TRADEMARK OFFICE
CERTIFICATE OF CORRECTION

PATENT NO. : 5,118,549
DATED : June 2, 1992
INVENTOR(S) : Hausler et al.

It is certified that error appears in the above-identified patent and that said Letters Patent is hereby corrected as shown below:

Column 2, line 15, please insert:

-- Figure 1 shows a partial cross-section through a compact disc of the conventional type. For greater clarity, the features are not drawn to scale.

Figure 2 shows a partial cross-section through a compact disc in accordance with the present invention. The proportions therein correspond to those of the compact disc shown in FIG. 1. - -

Signed and Sealed this

Fifth Day of October, 1993

Attest:

BRUCE LEHMAN

*Attesting Officer*     *Commissioner of Patents and Trademarks*